(12) United States Patent
D'Amico et al.

(10) Patent No.: US 7,100,256 B2
(45) Date of Patent: Sep. 5, 2006

(54) METHOD FOR CONVERTING A TRUCK BODY

(75) Inventors: John A. D'Amico, Casper, WY (US); Dennis A. Frank, Whitefish, MT (US)

(73) Assignee: Mine Rite Technologies, LLC, Casper, WY (US)

( * ) Notice: Subject to any disclaimer, the term of this patent is extended or adjusted under 35 U.S.C. 154(b) by 86 days.

(21) Appl. No.: 10/967,477

(22) Filed: Oct. 18, 2004

(65) Prior Publication Data

US 2006/0080818 A1    Apr. 20, 2006

(51) Int. Cl.
*B62D 33/02* (2006.01)
*B60P 1/26* (2006.01)

(52) U.S. Cl. .................... 29/401.1; 29/402.08; 29/462; 29/897.2; 296/183.2; 296/36

(58) Field of Classification Search ............... 29/401.1, 29/402.08, 462, 897.2; 296/183.2
See application file for complete search history.

(56) References Cited

U.S. PATENT DOCUMENTS

| | | | |
|---|---|---|---|
| 3,134,628 A | 5/1964 | Lackey et al. | |
| D217,726 S | 6/1970 | Cohn | |
| D235,528 S | 6/1975 | Ahola et al. | |
| 3,895,842 A * | 7/1975 | Fair | 298/1 R |
| D242,734 S | 12/1976 | Breneman et al. | |
| 5,316,357 A * | 5/1994 | Schroeder | 296/36 |
| 6,022,068 A | 2/2000 | D'Amico | |
| 2004/0026959 A1 | 2/2004 | Kostecki | |

* cited by examiner

*Primary Examiner*—David P. Bryant
*Assistant Examiner*—Christopher Agrawal
(74) *Attorney, Agent, or Firm*—Antoinette M. Tease

(57) ABSTRACT

A method for converting a dump truck body into an improved truck body. The dump truck body is configured for hauling a payload and has a canopy, a floor, two sidewalls, and a front wall. In a preferred embodiment, the method comprises: if the dump truck body has a tailgate, removing the tailgate; extending the floor to the rear by adding a floor extension component at a floor angle approximately ten degrees greater than a pre-conversion floor angle; increasing the height of the sidewalls by adding two fabricated sidewall attachment components; and tying the sidewall extensions into the rear of the floor extension component by adding a fabricated component. Preferably, a material dam is incorporated into the canopy forward of the front wall to form a shelf that is configured to retain and balance the payload.

13 Claims, 8 Drawing Sheets

PRIOR ART

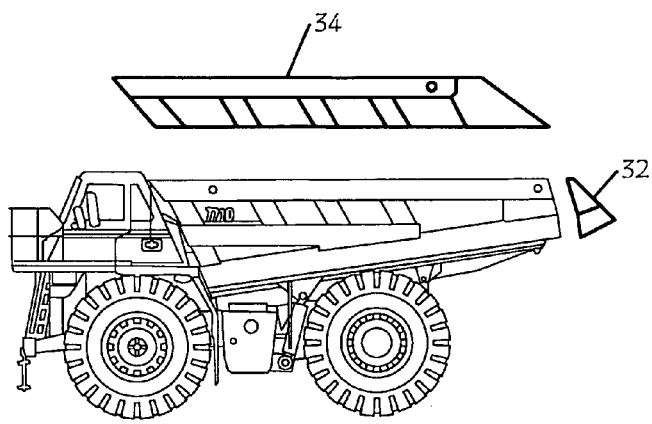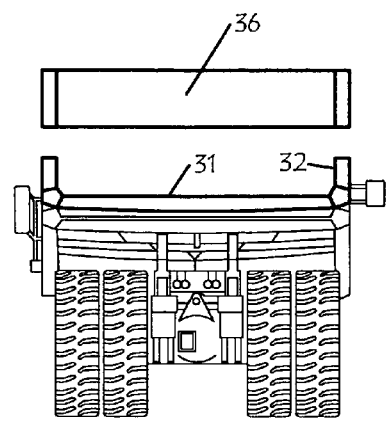
FIG. 5 　　　　　　　　FIG. 6
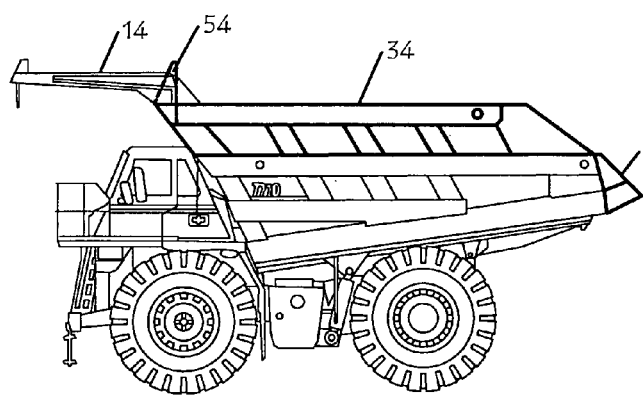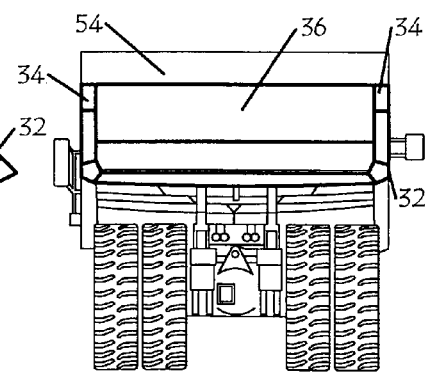
FIG. 7 　　　　　　　　FIG. 8

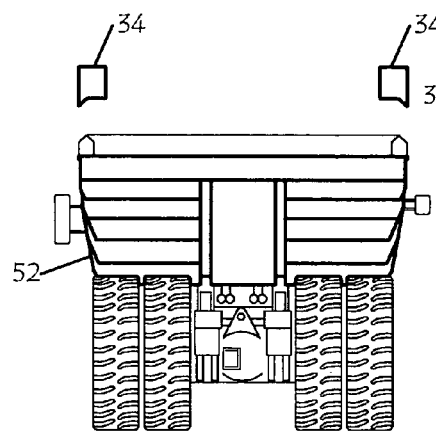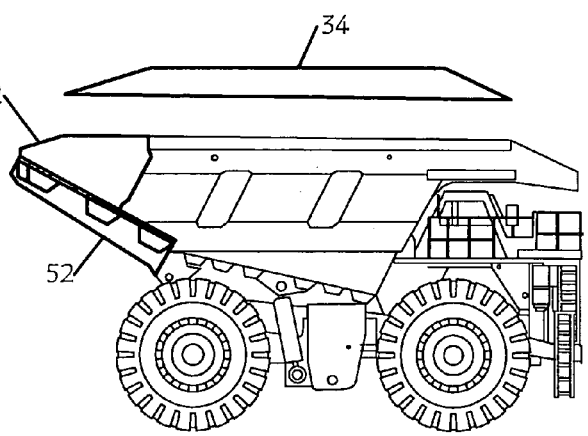
FIG. 15     FIG. 16
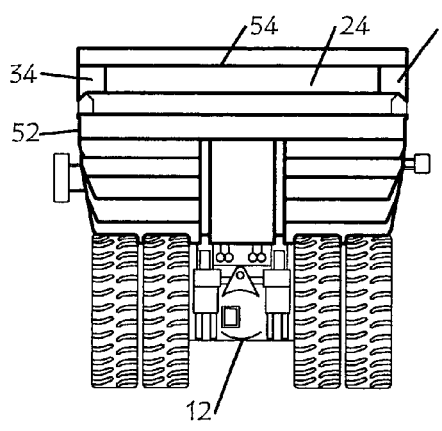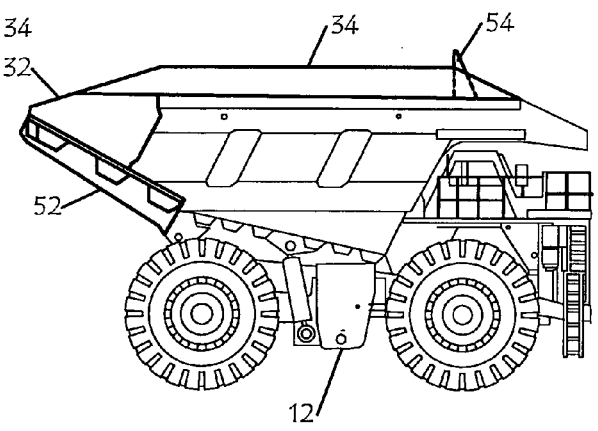
FIG. 17     FIG. 18

METHOD FOR CONVERTING A TRUCK BODY

CROSS-REFERENCE TO RELATED APPLICATIONS

Not Applicable

STATEMENT REGARDING FEDERALLY SPONSORED

RESEARCH OR DEVELOPMENT

Not Applicable

BACKGROUND OF THE INVENTION

This invention relates to a method for converting a truck body. In particular, the invention relates to a method for converting a dump truck body.

Conventional dump truck bodies are designed to haul a variety of materials, including dirt, rock, etc. The design of these dump truck bodies is based on accommodating the heaviest material to be hauled, typically material with an average density of about 3,000 pounds per cubic yard. The volumetric capacity of dump truck bodies is typically limited to ensure that the payload does not exceed the carrying capacity of the truck chassis.

Coal, however, has a density in the range of 1,100 to 1,700 pounds per cubic yard. Because of the lower density of coal, a conventional dump truck body is typically capable of carrying much more coal than can be accommodated by the volumetric capacity of the truck body. The solution to this problem has been to add a tailgate attachment to a conventional dump truck body to increase its volumetric capacity. This solution, however, adds a component to the truck (the tailgate attachment) that can create maintenance problems. Tailgate attachments also increase the weight of the truck body by twelve to fifteen thousand pounds, a weight increase that lowers the carrying capacity of the truck body.

The solution of adding a tailgate attachment to the truck body creates other problems and leaves other problems unsolved. Adding a tailgate does not prevent material from being loaded onto the truck body canopy, from which it can fall during transport. Furthermore, simply adding a tailgate attachment does not prevent one or the other of the two truck axles from being overloaded. This practice does not comply with the axle weight distribution specifications of truck chassis manufacturers.

The background art is characterized by U.S. Pat. Nos. 3,134,628; 6,022,068; Des. 217,726; Des. 235,528; and Des. 242,734; and U.S. Patent Application No. 2004/0026959; the disclosures of which patents and patent application are incorporated by reference as if fully set forth herein.

Lackey et al. in U.S. Pat. No. 3,134,628 disclose a tilting dump truck trailer. This invention is limited in that a tractor-trailer design is taught. Moreover, no method for improving existing dump truck bodies is taught.

D'Amico in U.S. Pat. No. 6,022,068 discloses a lightweight body for a dump truck. This invention is limited in that sections of the floor of the dump truck body must be arranged in order of increasing thickness or hardness. Moreover, no method for improving existing dump truck bodies is taught.

Cohn in U.S. Pat. No. Des. 217,726 discloses a toy truck or similar article. This invention is limited in that a toy design is taught. Moreover, no method for improving existing dump truck bodies is taught.

Ahola et al. in U.S. Pat. No. Des. 235,528 disclose a dump truck. This invention is limited in that a conventional dump truck design is taught. Moreover, no method for improving existing dump truck bodies is taught.

Breneman et al. in U.S. Pat. No. Des. 242,734 disclose a toy truck with a plow. This invention is limited in that a toy design is taught. Moreover, no method for improving existing dump truck bodies is taught.

Kostecki in U.S. Patent Application No. 2004/0026959 discloses a material transport container. This invention is limited in that the container must incorporate arcuate surfaces bridging junctions between walls and the floor of the container. Moreover, no method for improving existing dump truck bodies is taught.

The foregoing review of the background art reveals that a method for increasing the volumetric capacity of dump truck bodies is needed. The needed method would preferably also improve the efficiency and safety of operation of the dump truck and comply with the truck chassis manufacturer's specifications.

BRIEF SUMMARY OF THE INVENTION

The purpose of the invention is to provide a method for converting an existing large dump truck body into an ELIMINATOR™ truck body that is capable of carrying more material and retaining the material payload in the truck body, preferably without the need for a tailgate or other attachment-style retaining device. One advantage of preferred embodiments of the invention is that conversion increases the utilization of a truck fleet. Another advantage of preferred embodiments of the invention is that conversion eliminates the need for a high maintenance tailgate, thereby reducing maintenance costs. Yet another advantage of preferred embodiments of the invention is that conversion improves up time and increases production. A further advantage of preferred embodiments of the invention is that conversion increases capacity while maintaining the gross vehicle weight (GVW) rating of the dump truck. Another advantage of preferred embodiments of the invention is that conversion can be completed as part of the body rebuild. Yet another advantage of preferred embodiments of the invention is that the rebuild plus conversion can cost half as much as the cost of similar style new body.

One object of preferred embodiments of the invention is to increase the volume of material a dump truck can carry. Another object of preferred embodiments of the invention is to eliminate the need for a tailgate. Another object of preferred embodiments of the invention is increase the capacity of a dump truck body during a maintenance rebuild.

The invention is a method for converting a background art truck body into an improved truck body, thereby increasing the carrying capacity of the dump truck. The method is appropriate for application to at least any of the three types of large dump truck bodies in the background art: a dual-sloped truck body (which refers to the dual-sloped floor of the body), a flat-floored truck body, and a tailgated truck body (using an attached tailgate for increased payload retention).

In a preferred embodiment, the invention is a method for converting a dump truck body (e.g., a dual-sloped truck body) into an improved truck body, said dump truck body being configured for hauling a payload and having a canopy, a floor, two floor rail assemblies, two sidewalls, two sidewall top assemblies, and a front wall, said dump trunk body being supportable by a chassis having a front axle and a rear axle, said method comprising: removing the canopy; extending the floor and floor rail assemblies to the rear by adding a fabricated floor extension component; increasing the height of the sidewalls and the front wall by adding two fabricated sidewall attachment components and a fabricated front wall attachment component; reattaching the canopy to the top of the fabricated sidewall attachment components and the top of the front wall attachment component; and tying the sidewall extensions into the rear of the floor extension by adding a fabricated component. Preferably, a material dam is incorporated into the canopy forward of the front wall to form a shelf that is configured to retain the payload and facilitate balancing the payload when it is loaded into the improved truck body, so that a portion (e.g., about one-third) of the weight of the payload is distributed over the front axle and another portion (e.g., about two-thirds) of the weight of the payload is distributed over the rear axle.

In a preferred embodiment, the method involves establishing the sizes of the components to be added, prior to modifying the truck body in accordance with a method or process disclosed herein. Preferably, establishing the sizes of components involves: determining an approximate improved truck tonnage capacity by subtracting the weight of the improved truck body and the chassis (e.g., including the wheels, power train and operator station) from the gross vehicle weight rating (G.V.W.) established by the manufacturer of the truck chassis; calculating an approximate improved truck body volume when hauling the lowest density material expected to be hauled; and establishing an approximate size for each component so that the improved truck body accommodates the calculated approximate improved truck body volume.

In another preferred embodiment, the invention is a method for converting a dump truck body (e.g., a dual-sloped truck body) into an improved truck body, said dump truck body having a canopy, a floor, floor rail assemblies, sidewalls and a front wall, said method comprising: removing the canopy; extending the floor with a floor extension having a rear and the floor rail assemblies to produce an extended floor; increasing the height of the sidewalls with sidewall extensions and the front wall to produce taller sidewalls having a profile and a taller front wall; attaching the canopy at the taller front wall to match the profile of the taller sidewalls; and tying the sidewall extensions to the rear of the floor extension; whereby the improved truck body is capable of carrying a larger volume of material than the dump truck body and is capable of retaining the material in the improved truck body without a tailgate or other attachment-style retaining device.

In another preferred embodiment, the invention is a method for converting a dual-sloped truck body having a canopy, a floor, floor rail assemblies, sidewalls and a front wall, said method comprising: removing the canopy; extending the floor and the floor rail assemblies to the rear by adding a fabricated floor extension; increasing the height of the sidewalls and the front wall with sidewall attachments and a front wall attachment to produce new sidewalls and a new front wall; reattaching the canopy on the new front wall so that its height matches the height of the new sidewalls; tying the new sidewall attachments to the rear of the floor extension with a fabricated component; and incorporating a material dam into the rear of the canopy, forward of the new front wall, to form a material shelf.

In yet another embodiment, the invention is a method for converting a dual-sloped truck body having a floor, floor rail assemblies, sidewalls and a front wall, said method comprising: extending the floor and the floor rail assemblies to the rear by adding a floor extension having a back end; increasing the height of the sidewalls with new sidewall attachments and the front wall to produce new sidewalls having a new sidewall height and a new front wall; attaching a canopy having a rear on the new front wall so that its height matches the new sidewall height; tying the new sidewall attachments to the back end of the floor extension with a new component; and incorporating a material dam into the rear of the canopy, forward of the new front wall, to form a material shelf.

In another preferred embodiment, the invention is a method for converting a dump truck body (e.g., a flat-floor truck body) into an improved truck body, said dump truck body being configured for hauling a payload and having a floor, two floor rail assemblies, two sidewalls, two sidewall top assemblies, and a front wall, said dump trunk body being supportable by a chassis having a front axle and a rear axle, and said floor being sloped at a pre-conversion floor angle with respect to a plane extending between said two axles, said method comprising: removing the rear portion (e.g., approximately one-third) of the dump truck body floor and floor rail assemblies and a portion of the sidewalls associated with the removed portions of the dump truck body floor and floor rail assemblies; re-installing the rear portion (e.g., approximately one-third) of the truck body floor and floor rail assemblies at a floor angle approximately ten degrees greater than the pre-conversion floor angle; increasing the height of the sidewalls by adding two fabricated sidewall extension components; and tying the sidewall extension components into the rear of the re-installed floor by adding a fabricated component designed to do so. Preferably, a material dam is incorporated into the canopy forward of the front wall to form a shelf that is configured to retain the payload and facilitate balancing the payload when it is loaded into the improved truck body, so that a portion (e.g., about one-third) of the weight of the payload is distributed over the front axle and another portion (e.g., about two-thirds) of the weight of the payload is distributed over the rear axle.

In another preferred embodiment, the invention is a method for converting a dump truck body into an improved truck body, said dump truck body being configured for hauling a payload and having a floor, two floor rail assemblies, two sidewalls, two sidewall top assemblies, and a front wall, said dump trunk body being supportable by a chassis having a front axle and a rear axle, and said floor being sloped at a pre-conversion floor angle, said method comprising: removing the rear approximately one-third of the dump truck body floor and a portion of the sidewalls associated with the removed portions of the dump truck body floor and floor rail assemblies; re-installing the rear approximate one-third of the truck body floor at a floor angle approximately ten degrees greater than the pre-conversion floor angle to form a re-installed floor having a rear; increasing the height of the sidewalls by adding two fabricated sidewall extension components; and tying said fabricated sidewall extension components into the rear of the re-installed floor by adding a fabricated component; wherein a material dam is incorporated into the canopy to form a shelf that is configured to retain the payload and facilitate balancing the payload, so that a first portion of the weight of the payload is distributed over the front axle and a second portion of the weight of the payload is distributed over the rear axle.

In another preferred embodiment, the invention is a method for converting a truck body having a canopy, a floor, floor rail assemblies, sidewalls and a front wall, said method comprising: removing the rear approximately one third of the floor and floor rail assemblies and a portion of the rear sidewalls; re-installing the rear one third of the floor and floor rail assemblies at an angle approximately ten degrees higher than the angle of inclination of the remaining front portion of floor and floor rail assemblies to create a raised rear floor; increasing the height of the truck body sidewalls with fabricated sidewall extensions; tying said sidewall extensions into the rear of the raised rear floor with a fabricated component; and installing a material dam on the rear of the canopy, forward of the front wall to form a material shelf.

In another preferred embodiment, the invention is a method for converting a truck body having a canopy, a floor, floor rail assemblies, sidewalls and a front wall, said method comprising: removing a portion of the floor and floor rail assemblies and a part of the rear sidewalls; re-installing a modified portion of the floor and floor rail assemblies at an angle approximately ten degrees higher than the angle of inclination of the remaining front portion of floor and floor rail assemblies to create a raised rear floor; increasing the height of the truck body sidewalls with fabricated sidewall extensions; tying said sidewall extensions into the rear of the raised rear floor with a fabricated component; and installing a material dam on the rear of the canopy, forward of the front wall to form a material shelf.

In yet another preferred embodiment, the invention is a method for converting a dump truck body (e.g., a tailgated truck body) into an improved truck body, said dump truck body being configured for hauling a payload and having a canopy, a floor, two floor rail assemblies, two sidewalls, two sidewall top assemblies, a front wall and a tailgate attachment, said dump trunk body being supportable by a chassis having a front axle and a rear axle, and said floor being sloped at a pre-conversion floor angle with respect to a plane extending between said two axles, said method comprising: removing the tailgate attachment; removing a portion (e.g., the rear approximately one-third) of the dump truck body floor and floor rail assemblies and a portion of the sidewalls associated with the removed portions of the dump truck body floor and floor rail assemblies; re-installing the rear approximately one-third of the truck body floor and floor rail assemblies at a floor angle approximately ten degrees greater than the pre-conversion floor angle; increasing the height of the sidewalls by adding two fabricated sidewall extension components; and tying the fabricated sidewall extension components into the rear of the re-installed floor by adding a fabricated component. Preferably, a material dam is incorporated into the canopy forward of the front wall to form a shelf that is configured to retain the payload and facilitate balancing the payload when it is loaded into the improved truck body, so that a portion (e.g., about one-third) of the weight of the payload is distributed over the front axle and another portion (e.g., about two-thirds) of the weight of the payload is distributed over the rear axle.

In yet another preferred embodiment, the invention is a process for converting a truck body having a tailgate to a truck body without a tailgate, wherein the truck body comprises a floor and frame rail assemblies, said process comprising: removing the tailgate; cutting off the rear approximately one third of the truck body; re-installing a portion of the rear third of the truck body at an angle that is about ten degrees higher than the angle of inclination of the floor of the front two-thirds of the truck body; connecting the frame rail assemblies on the rear third of the truck body to the frame rail assemblies on the front two-thirds of the truck body; adding side boards on top of the truck body to increase capacity; and adding a material dam in the front of the truck body to create a loading shelf.

In another preferred embodiment, the invention is a method for converting a truck body having a canopy, a floor, floor rail assemblies, sidewalls, a front wall and a tailgate attachment, said method comprising: removing the tailgate attachment and the rear approximately one-third of the floor and floor rail assemblies and a portion of the rear sidewalls; re-installing the rear approximately one-third of the floor and floor rail assemblies at an angle approximately ten degrees higher than the angle of inclination of the remaining front portion of the floor to produce a raised rear floor; increasing the height of the sidewalls with fabricated sidewall extensions; tying the fabricated sidewall extensions to the raised rear floor with a fabricated component; and installing a material dam on the rear of the canopy, forward of the truck body front wall, to form a material shelf.

In yet another preferred embodiment, the invention is a method for converting a dump truck body into an improved truck body, said dump truck body being configured for hauling a payload and having a canopy, a floor, two sidewalls, and a front wall, said dump trunk body being supportable by a chassis having a front axle and a rear axle, and said floor being sloped at a pre-conversion floor angle with respect to a plane extending between said two axles, said method comprising: if the dump truck body has a tailgate, removing the tailgate; extending the floor to the rear by adding a floor extension component at a floor angle approximately ten degrees greater than the pre-conversion floor angle; increasing the height of the sidewalls by adding two fabricated sidewall attachment components; and tying the sidewall attachment components into the rear of the floor extension component by adding a fabricated component; wherein a material dam is incorporated into the canopy forward of the front wall to form a shelf that is configured to retain the payload and facilitate balancing the payload when it is loaded into the improved truck body, so that about one-third of the weight of the payload is distributed over the front axle and about two-thirds of the weight of the payload is distributed over the rear axle.

In a preferred embodiment, the invention is a process for converting a truck body having a truck body floor, the truck body either having no tailgate or having had its tailgate removed, said process comprising: installing a truck body floor extension component at an angle that is about ten degrees greater than the angle of inclination of the front of the truck body floor; adding side boards on top of the truck body to increase its volumetric capacity; and adding a material dam to the front of the truck body to create a loading shelf.

In a further preferred embodiment, the invention is the product of one of the methods or processes disclosed herein. In another preferred embodiment, the invention is an improved truck body in accordance with a method or process disclosed here in combination with a truck chassis.

Further aspects of the invention will become apparent from consideration of the drawings and the ensuing description of preferred embodiments of the invention. A person skilled in the art will realize that other embodiments of the invention are possible and that the details of the invention can be modified in a number of respects, all without departing from the concept. Thus, the following drawings and description are to be regarded as illustrative in nature and not restrictive.

BRIEF DESCRIPTION OF THE DRAWINGS

The features of the invention will be better understood by reference to the accompanying drawings which illustrate presently preferred embodiments of the invention. In the drawings:

FIG. 5 is an exploded side elevation view of a dual-sloped truck body supported by a truck chassis after other steps of a preferred embodiment of the method disclosed herein have been performed.

FIG. 6 is an exploded rear elevation view of a dual-sloped truck body supported by a truck chassis after other steps of a preferred embodiment of the method disclosed herein have been performed.

FIG. 7 is an assembled side elevation view of a dual-sloped truck body supported by a truck chassis after other steps of a preferred embodiment of the method disclosed herein have been performed.

FIG. 8 is an assembled rear elevation view of a dual-sloped truck body supported by a truck chassis after other steps of a preferred embodiment of the method disclosed herein have been performed.

FIG. 15 is an exploded rear elevation view of a background art truck body supported by a truck chassis during the performance of another step of a preferred embodiment of the method disclosed herein.

FIG. 16 is an exploded side elevation view of a flat-floor truck body supported by a truck chassis during the performance of another step of a preferred embodiment of the method disclosed herein.

FIG. 17 is a rear elevation view of a flat-floor truck body supported by a truck chassis after another step of a preferred embodiment of the method disclosed herein has been performed.

FIG. 18 is a side elevation view of a flat-floor truck body supported by a truck chassis after another step of a preferred embodiment of the method disclosed herein has been performed.

Figure 1:
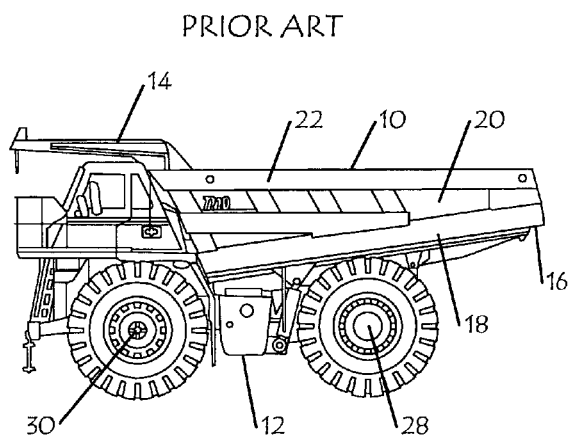
FIG. 1 is a side elevation view of a background art dual-sloped truck body supported by a truck chassis.

The following reference numerals are used to indicate the parts and environment of the invention on the drawings:

10 dual-sloped dump truck body
12 truck chassis
14 canopy
16 floor
18 floor rail assemblies
20 sidewalls
22 sidewall top assemblies
24 front wall
28 rear axle
30 front axle
31 floor extension component
32 fabricated extension component
34 fabricated sidewall attachment components, fabricated sidewall extension components, sidewall extensions
36 fabricated front wall attachment component
40 flat-floor dump truck body
42 removed portion
44 upper edge
46 post-conversion floor angle
48 pre-conversion floor angle
52 retained portion
54 material dam 60 tailgated dump truck body
62 tailgate attachment

DETAILED DESCRIPTION OF THE INVENTION

The invention is a method for converting a background art truck body into an improved truck body. The method is appropriate for application to any of the three types of large dump truck bodies known in the background art: a dual-sloped truck body (which refers to the dual-sloped floor of the body), a flat-floored truck body, and a tailgated truck body (using an attached tailgate for increased payload retention). It is also applicable to foreseeable dump truck bodies. Application of the method to each of these dump truck body types is described herein.

Figure 2:
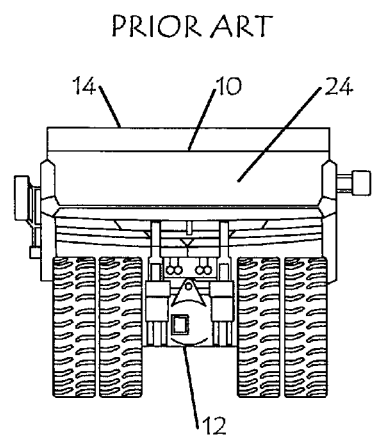
FIG. 2 is a rear elevation view of a background art dual-sloped truck body supported by a truck chassis.

Referring to FIGS. 1 and 2, side and rear elevation views are presented of background art dual-sloped dump truck body 10 and truck chassis 12. Dual-sloped dump truck body 10 is configured for hauling a payload (not shown) and comprises canopy 14, floor 16, two floor rail assemblies 18, two sidewalls 20, two sidewall top assemblies 22, and front wall 24. Dump trunk body 10 is supportable by truck chassis 12 having front axle 30 and rear axle 28.

In a preferred embodiment, the method of the present invention involves removing portions of background art truck body 10 and adding components to background art truck body 10. Cutting operations are preferably performed by cutting with a torch and adding operations are preferably performed by welding, but other techniques known in the art may also be used.

Figure 3:
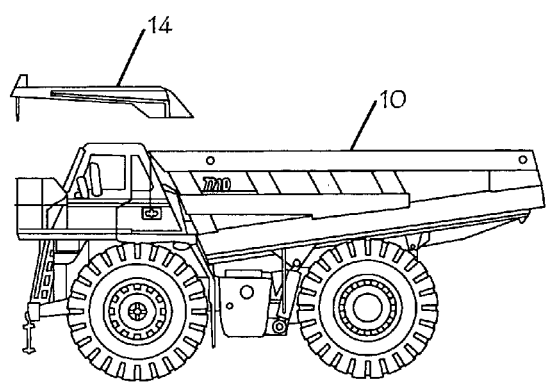
FIG. 3 is a side elevation view of a dual-sloped truck body supported by a truck chassis after a step of a preferred embodiment of the method disclosed herein has been performed.
Figure 4:
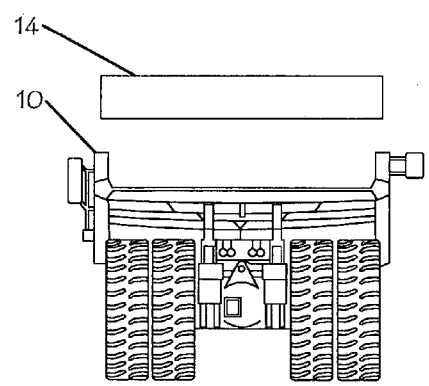
FIG. 4 is a rear elevation view of a dual-sloped truck body supported by a truck chassis after a step of a preferred embodiment of the method disclosed herein has been performed.

An initial step in a preferred embodiment of the method involves removing canopy 14. Referring to FIGS. 3 and 4, the condition of dump trunk body 10 after the step of removing canopy 14 has been performed is illustrated.

Another step in a preferred embodiment of the method involves extending floor 16 and floor rail assemblies 18 to the rear by adding floor extension component 31. Yet another step in a preferred embodiment of the method is increasing the height of sidewalls 20 and front wall 24 by adding two fabricated sidewall attachment components 34 and fabricated front wall attachment component 36. Alternatively, fabricated sidewall extensions 34 can be attached to front wall attachment component 36 to create a vertical body extension subassembly and the entire vertical body extension subassembly can be attached to body 10. Referring to FIGS. 5 and 6, an exploded rear elevation view is presented of a background art dual-sloped truck body supported by a truck chassis after these steps of the method disclosed herein have been performed.

Another step in a preferred embodiment of the method involves reattaching canopy 14 to the top of fabricated sidewall attachment components 34 and the top of front wall attachment component 36. Another step in a preferred embodiment of the method involves tying sidewall extensions 34 into the rear of floor extension component 31 by means of fabricated extension component 32. Alternatively, sidewall extensions 34 can be first attached to floor extension component 31 to create a horizontal body extension subassembly and the entire horizontal body extension subassembly can be attached to body 10. Preferably, a material dam 54 is incorporated into canopy 14 forward of front wall 24 to form a shelf that is configured to retain the payload and facilitate balancing the payload when it is loaded into the improved truck body, so that about one-third of the weight of the payload is distributed over front axle 30 and about two-thirds of the weight of the payload is distributed over rear axle 28. Referring to FIGS. 7 and 8, an assembled rear elevation view is presented of a background art dual-sloped truck body supported by a truck chassis after these steps of the method disclosed herein have been performed.

In a preferred embodiment, the method involves performing the step of establishing the size of the added components prior to modifying the truck body. The step of establishing the sizes of the components to be added preferably comprises: determining an improved truck tonnage capacity by subtracting the weight of the improved truck body and the chassis from the gross vehicle weight rating established by the manufacturer of the truck body and chassis; calculating an improved truck body volume when hauling the lowest density material to be hauled; and establishing a size for each component so that the improved truck body accommodates the calculated volume. In an alternative embodiment of the method, the sizes of the added components are determined after an increased side wall height is established arbitrarily.

Figure 9:
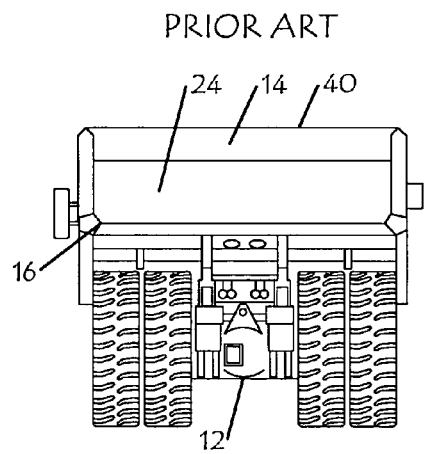
FIG. 9 is a rear elevation view of a background art flat-floor truck body supported by a truck chassis.
Figure 10:
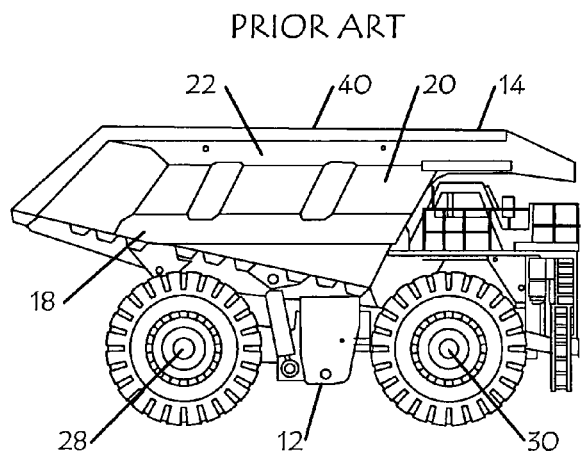
FIG. 10 is a side elevation view of a background art flat-floor truck body supported by a truck chassis.

Referring to FIGS. 9 and 10, side and rear elevation views are presented of background art flat-floor dump truck body 40 and truck chassis 12. Flat-floored dump truck body 40 is configured for hauling a payload (not shown) and comprises canopy 14, floor 16, two floor rail assemblies 18, two sidewalls 20, two sidewall top assemblies 22, and front wall 24. Dump trunk body 40 is supportable by truck chassis 12 having front axle 30 and rear axle 28. Floor 16 is sloped at a pre-conversion floor angle with respect to a plane extending between the two axles.

Figure 11:
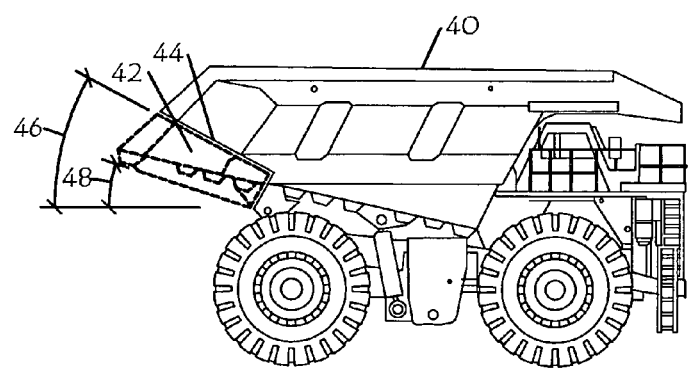
FIG. 11 is a side elevation view of a flat-floor truck body supported by a truck chassis after an initial step of a preferred embodiment of the method disclosed herein has been performed.

An initial step in a preferred embodiment of the method involves removing the rear approximately one-third of dump truck body floor 16 and floor rail assemblies 18 and a portion of sidewalls 20 associated with the removed portions of dump truck body floor and floor rail assemblies 18. Referring to FIG. 11, removed portion 42 of dump truck body 40 is shown in dashed lines, and the cut is shown in a solid line. Note that upper edge 44 of removed portion 42 forms post-conversion floor angle 46, which is about ten degrees greater than the pre-conversion floor angle 48.

Figure 12:
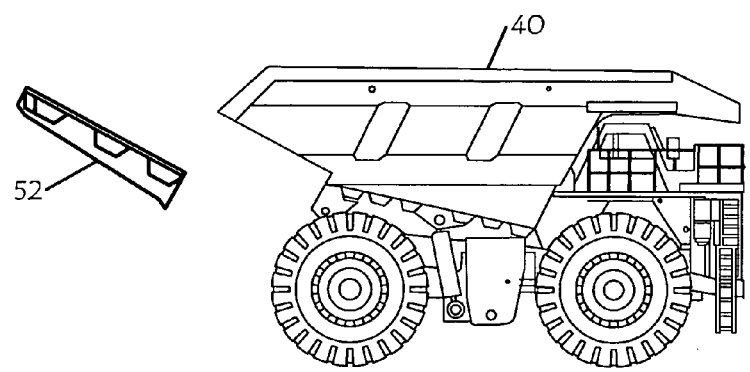
FIG. 12 is an exploded side elevation view of a flat-floor truck body supported by a truck chassis after another step of a preferred embodiment of the method disclosed herein has been performed.

Another step in a preferred embodiment of the method involves re-installing retained portion 52 of the rear approximately one-third of the truck body floor and floor rail assemblies at a post-conversion floor angle 46 that is approximately ten degrees greater than the pre-conversion floor angle 48. Referring to FIG. 12, an exploded view is presented of truck body 40 after this step has been performed.

Figures 13, 14:
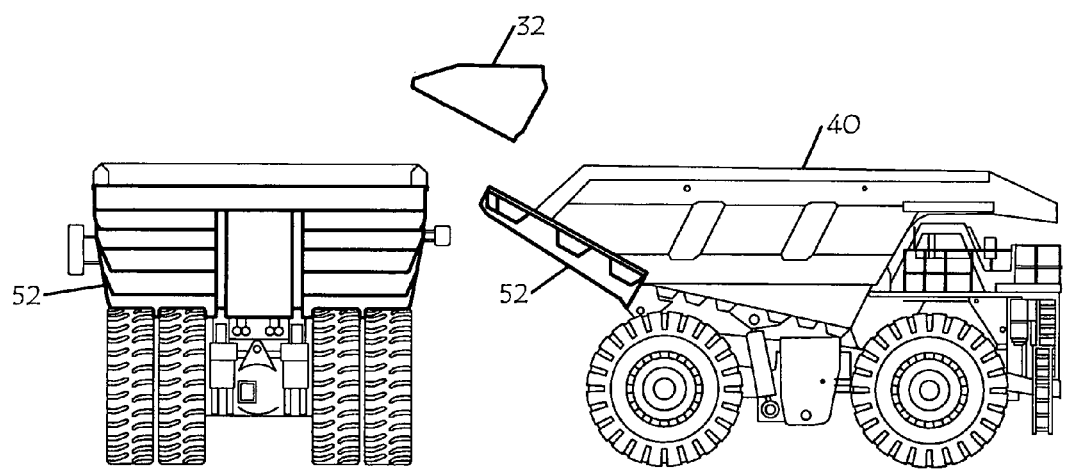
FIG. 13 is a rear elevation view of a background art truck body supported by a truck chassis after another step of a preferred embodiment of the method disclosed herein has been performed.
FIG. 14 is a side elevation view of a background art truck body supported by a truck chassis during the performance of another step of a preferred embodiment of the method disclosed herein.

Another step in this preferred embodiment of the method involves adding fabricated extension component 32 that is designed to tie fabricated sidewall extension components 34 into the rear of re-installed retained portion 52. Alternatively, sidewall extension components 34 can be first attached to retained portion 52 to create a horizontal body extension subassembly and the entire horizontal body extension subassembly can be attached to body 40. FIGS. 13 and 14 show retained portion 52 installed and fabricated extension component 32 being lowered into place.

Another step in this preferred embodiment of the method involves increasing the height of sidewalls 20 by adding two fabricated sidewall extension components 34. FIGS. 15 and 16 show fabricated sidewall extension components 34 being lowered into place.

In a preferred embodiment, material dam 54 is incorporated into canopy 14 forward of front wall 24 to form a shelf that is configured to retain the payload and facilitate balancing the payload when it is loaded into the improved truck body, so that about one-third of the weight of the payload is distributed over front axle 30 and about two-thirds of the weight of the payload is distributed over rear axle 28. Referring to FIGS. 17 and 18, an assembled rear elevation view and an assembled side elevation view are presented of flat-floor truck body 40 supported by truck chassis 12 after these steps of the method disclosed herein have been performed.

In this preferred embodiment, too, the method involves performing the step of establishing the size of the added components prior to modifying the flat-floor truck body. The step of establishing the sizes of the components to be added preferably comprises: determining an improved truck tonnage capacity by subtracting the weight of the improved truck body and the chassis from the gross vehicle weight rating established by the manufacturer of the truck body and chassis; calculating an improved truck body volume when hauling the lowest density material to be hauled; and establishing a size for each component so that the improved truck body accommodates the calculated volume. In an alternative embodiment of the method, the sizes of the added components are determined after an increased side wall height is established arbitrarily.

Figure 19:
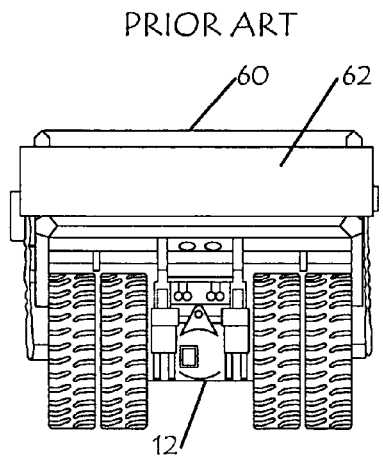
FIG. 19 is a rear elevation view of a background art tailgated truck body supported by a truck chassis.
Figure 20:
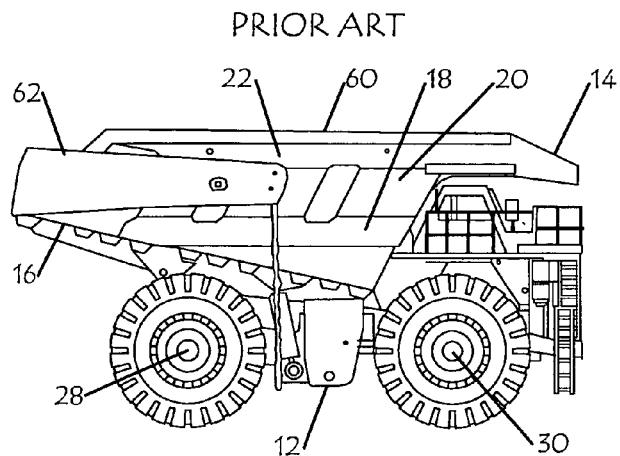
FIG. 20 is a side elevation view of a background art tailgated truck body supported by a truck chassis.

Referring to FIGS. 19 and 20, rear and side elevation views are presented of background art tailgated dump truck body 60 and truck chassis 12. Tailgated dump truck body 60 is configured for hauling a payload (not shown) and comprises canopy 14, floor 16, two floor rail assemblies 18, two sidewalls 20, two sidewall top assemblies 22, and a front wall 24. Dump trunk body 60 is supportable by truck chassis 12 having front axle 30 and rear axle 28. Floor 16 is sloped at a pre-conversion angle with respect to a plane extending between the two axles 28 and 30.

Figures 21, 22:
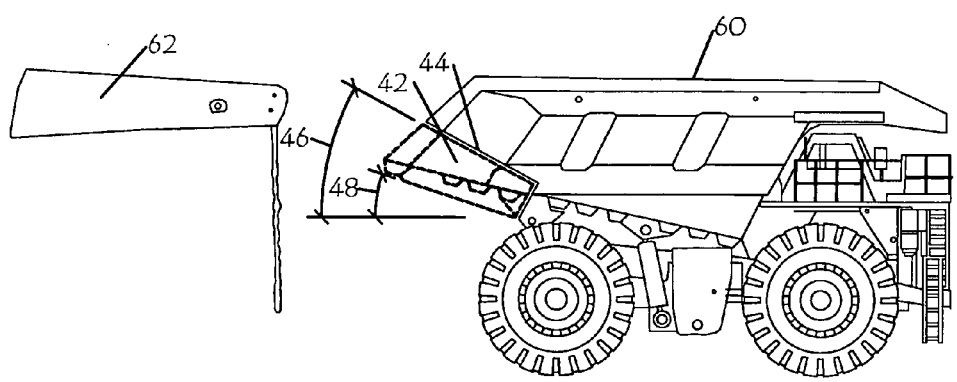
FIG. 21 is a side elevation view of the removed tailgate attachment in accordance with a preferred embodiment of the method disclosed herein.
FIG. 22 is a side elevation view of a tailgated truck body supported by a truck chassis after a step of a preferred embodiment of the method disclosed herein has been performed.

An initial step in a preferred embodiment of the method involves removing tailgate attachment 62. Referring to FIG. 21, tailgate attachment 62 is shown in a removed state.

Another step in a preferred embodiment of the method involves removing the rear approximately one-third of dump truck body floor 16 and floor rail assemblies 18 and a portion of sidewalls 20 associated with the removed portions of dump truck body floor and floor rail assemblies 18. Referring to FIG. 22, removed portion 42 of dump truck body 60 is shown in dashed lines, and the cut is shown in a solid line. Note that upper edge 44 of removed portion 42 forms post-conversion floor angle 46, which is about ten degrees greater than the pre-conversion floor angle 48.

Figure 23:
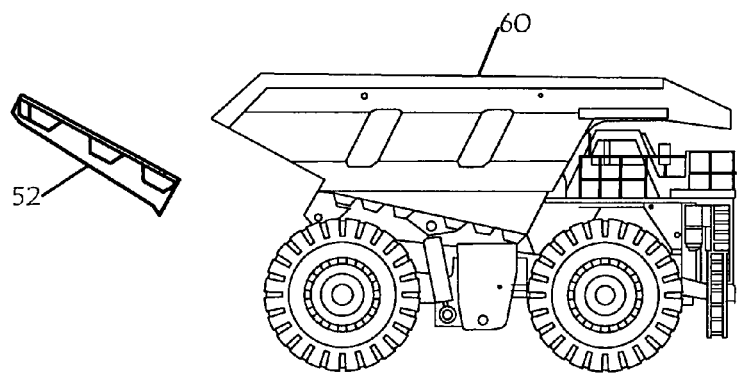
FIG. 23 is an exploded side elevation view of a tailgated truck body supported by a truck chassis after another step of a preferred embodiment of the method disclosed herein has been performed.

Another step in a preferred embodiment of the method involves re-installing retained portion 52 of the rear approximately one-third of the truck body floor and floor rail assemblies at a post-conversion floor angle 46 that is approximately ten degrees greater than the pre-conversion floor angle. Referring to FIG. 23, an exploded view is presented of truck body 60 after this step has been performed.

Figures 24, 25:
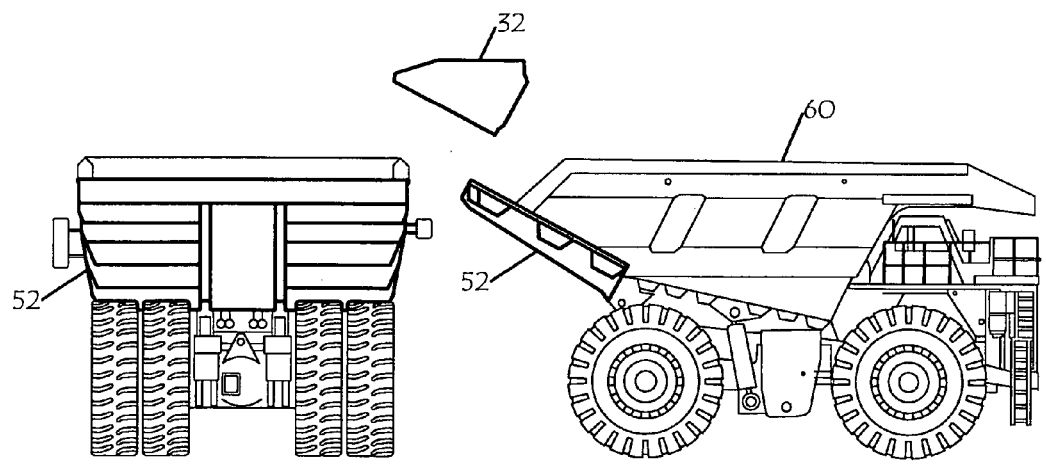
FIG. 24 is a rear elevation view of a tailgated truck body supported by a truck chassis after another step of a preferred embodiment of the method disclosed herein has been performed.
FIG. 25 is a side elevation view of a tailgated truck body supported by a truck chassis during the performance of another step of a preferred embodiment of the method disclosed herein.

Another step in this preferred embodiment of the method involves adding fabricated extension component 32 that is designed to tie fabricated sidewall extension components 34 into the rear of re-installed retained portion 52. Alternatively, sidewall extension components 34 can be first attached to retained portion 52 to create a horizontal body extension subassembly and the entire horizontal body extension subassembly can be attached to body 10. FIGS. 24 and 25 show retained portion 52 installed and fabricated extension component 32 being lowered into place.

Figures 26, 27:
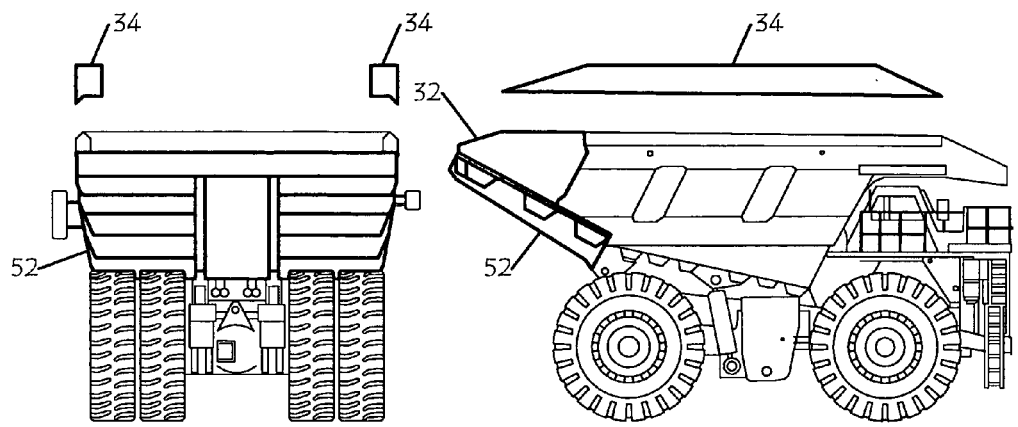
FIG. 26 is an exploded rear elevation view of a tailgated truck body supported by a truck chassis during the performance of another step of a preferred embodiment of the method disclosed herein.
FIG. 27 is an exploded side elevation view of a tailgated truck body supported by a truck chassis during the performance of another step of a preferred embodiment of the method disclosed herein.

Another step in this preferred embodiment of the method involves increasing the height of sidewalls 20 by adding two fabricated sidewall extension components 34. FIGS. 26 and 27 show fabricated sidewall extension components 34 being lowered into place.

Figures 28, 29:
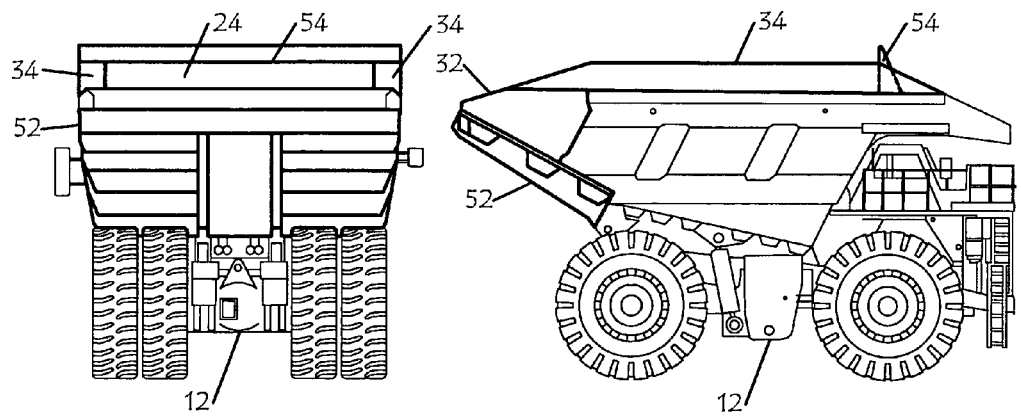
FIG. 28 is a rear elevation view of a tailgated truck body supported by a truck chassis after another step of a preferred embodiment of the method disclosed herein has been performed.
FIG. 29 is a side elevation view of a tailgated truck body supported by a truck chassis after another step of a preferred embodiment of the method disclosed herein has been performed.

In a preferred embodiment, material dam 54 is incorporated into canopy 14 forward of front wall 24 to form a shelf that is configured to retain the payload and facilitate balancing the payload when it is loaded into the improved truck body, so that about one-third of the weight of the payload is distributed over front axle 30 and about two-thirds of the weight of the payload is distributed over rear axle 28. Referring to FIGS. 28 and 29, an assembled rear elevation view and an assembled side elevation view are presented of tailgated truck body 60 supported by truck chassis 12 after these steps of the method disclosed herein have been performed.

In this preferred embodiment, too, the method involves performing the step of establishing the size of the added components prior to modifying the tailgated truck body. The step of establishing the sizes of the components to be added preferably comprises: determining an improved truck tonnage capacity by subtracting the weight of the improved truck body and the chassis from the gross vehicle weight rating established by the manufacturer of the truck body and chassis; calculating an improved truck body volume when hauling the lowest density material to be hauled; and establishing a size for each component so that the improved truck body accommodates the calculated volume. In an alternative embodiment of the method, the sizes of the added components are determined after an increased side wall height is established arbitrarily.

Many variations of the invention will occur to those skilled in the art. Some variations include removing and/or re-installing body portions having the proportions illustrated herein. Other variations call for removing and/or re-installing body portions having other proportions. All such variations are intended to be within the scope and spirit of the invention.

Although some embodiments are shown to include certain features, the applicant(s) specifically contemplate that any feature disclosed herein may be used together or in combination with any other feature on any embodiment of the invention. It is also contemplated that any feature may be specifically excluded from any embodiment of an invention and that the steps of the methods disclosed herein may be performed in any foreseeable order, which may differ from the order stated in the specification or claims.

We claim:

1. A method for converting a dump truck body into an improved truck body, said dump truck body being configured for hauling a payload and having a canopy, a floor, two floor rail assemblies, two sidewalls, two sidewall top assemblies, and a front wall, said dump trunk body being supportable by a chassis having a front axle and a rear axle, said method comprising:

removing the canopy;

extending the floor and floor rail assemblies to the rear by adding a fabricated floor extension component;

increasing the height of the sidewalls and the front wall by adding two fabricated sidewall attachment components and a fabricated front wall attachment component;

reattaching the canopy to the top of the fabricated sidewall attachment components and the top of the front wall attachment component; and tying the fabricated sidewall attachment components into the rear of the fabricated floor extension component by adding a fabricated component;

wherein a material dam is incorporated into the canopy forward of the front wall to form a shelf that is configured to retain the payload and facilitate balancing the payload when it is loaded into the improved truck body, so that about one-third of the weight of the payload is distributed over the front axle and about two-thirds of the weight of the payload is distributed over the rear axle.

2. The method of claim 1 further comprising:
prior to modifying the truck body, establishing the sizes of the components to be added by
  determining an improved truck tonnage capacity by subtracting the weight of the improved truck body and the chassis from the gross vehicle weight rating established by the manufacturer of the truck chassis,
  calculating an improved truck body volume when hauling the lowest density material expected to be hauled, and
  establishing a size for each component so that the improved truck body accommodates the calculated volume.

3. A method for converting a dual-sloped truck body having a canopy, a floor, floor rail assemblies, sidewalls and a front wall, said method comprising:
  removing the canopy;
  extending the floor and the floor rail assemblies to the rear by adding a fabricated floor extension;
  increasing the height of the sidewalls and the front wall with sidewall attachments and a front wall attachment to produce new sidewalls and a new front wall;
  reattaching the canopy on the new front wall so that its height matches the height of the new sidewalls;
  tying the new sidewall attachments to the rear of the fabricated floor extension with a fabricated component; and
  incorporating a material dam into the rear of the canopy, forward of the new front wall, to form a material shelf.

4. A method for converting a dump truck body into an improved truck body, said dump truck body being configured for hauling a payload and having a canopy, a floor, two floor rail assemblies, two sidewalls, two sidewall top assemblies, and a front wall, said dump trunk body being supportable by a chassis having a front axle and a rear axle, and said floor being sloped at a pre-conversion floor angle with respect to a plane extending between said two axles, said method comprising:
  removing the rear approximately one-third of the dump truck body floor and floor rail assemblies and a portion of the sidewalls associated with the removed portions of the dump truck body floor and floor rail assemblies;
  re-installing the rear approximately one-third of the truck body floor and floor rail assemblies at a floor angle approximately ten degrees greater than the pre-conversion floor angle;
  increasing the height of the sidewalls by adding two fabricated sidewall extension components; and
  tying the fabricated sidewall extension components into the rear of the re-installed floor by adding a fabricated component designed to do so;
  wherein a material dam is incorporated into the canopy forward of the front wall to form a shelf that is configured to retain the payload and facilitate balancing the payload when it is loaded into the improved truck body, so that about one-third of the weight of the payload is distributed over the front axle and about two-thirds of the weight of the payload is distributed over the rear axle.

5. The method of claim 4 further comprising:
prior to modifying the truck body, establishing the sizes of the components to be added by
  determining an approximate improved truck tonnage capacity by subtracting the weight of the improved truck body and the chassis from the gross vehicle weight rating established by the manufacturer of the truck chassis,
  calculating an approximate improved truck body volume when hauling the lowest density material expected to be hauled, and
  establishing an approximate size for each component so that the improved truck body accommodates the calculated approximate improved truck body volume.

6. A method for converting a dump truck body into an improved truck body, said dump truck body being configured for hauling a payload and having a canopy, a floor, two floor rail assemblies, two sidewalls, two sidewall top assemblies, and a front wall, said dump trunk body being supportable by a chassis having a front axle and a rear axle, and said floor being sloped at a pre-conversion floor angle, said method comprising:
  removing the rear approximately one-third of the dump truck body floor and a portion of the sidewalls associated with the removed portions of the dump truck body floor and floor rail assemblies;
  re-installing the rear approximately one-third of the truck body floor at a floor angle approximately ten degrees greater than the pre-conversion floor angle to form a re-installed floor having a rear;
  increasing the height of the sidewalls by adding two fabricated sidewall extension components; and
  tying the fabricated sidewall extension components into the rear of the re-installed floor by adding a fabricated component;
  wherein a material dam is incorporated into the canopy to form a shelf that is configured to retain the payload and facilitate balancing the payload, so that a first portion of the weight of the payload is distributed over the front axle and a second portion of the weight of the payload is distributed over the rear axle.

7. A method for converting a truck body having a canopy, a floor, floor rail assemblies, sidewalls and a front wall, said method comprising:
  removing the rear approximately one third of the floor and floor rail assemblies and a portion of the rear sidewalls;
  re-installing the rear one third of the floor and floor rail assemblies at an angle approximately ten degrees higher than the angle of inclination of the remaining front portion of floor and floor rail assemblies to create a raised rear floor;
  increasing the height of the truck body sidewalls with fabricated sidewall extensions;
  tying the fabricated sidewall extensions into the rear of the raised rear floor with a fabricated component; and
  installing a material dam on the rear of the canopy, forward of the front wall to form a material shelf.

8. A method for converting a truck body having a canopy, a floor, floor rail assemblies, sidewalls and a front wall, said method comprising:
  removing a portion of the floor and floor rail assemblies and a part of the rear sidewalls;
  re-installing a modified portion of the floor and floor rail assemblies at an angle approximately ten degrees higher than the angle of inclination of the remaining front portion of floor and floor rail assemblies to create a raised rear floor;

increasing the height of the truck body sidewalls with fabricated sidewall extensions;

tying the fabricated sidewall extensions into the rear of the raised rear floor with a fabricated component; and installing a material dam on the rear of the canopy, forward of the front wall to form a material shelf.

9. A method for converting a dump truck body into an improved truck body, said dump truck body being configured for hauling a payload and having a canopy, a floor, two floor rail assemblies, two sidewalls, two sidewall top assemblies, a front wall and a tailgate attachment, said dump trunk body being supportable by a chassis having a front axle and a rear axle, and said floor being sloped at a pre-conversion floor angle with respect to a plane extending between said two axles, said method comprising:

removing the tailgate attachment;

removing the rear approximately one-third of the dump truck body floor and floor rail assemblies and a portion of the sidewalls associated with the removed portions of the dump truck body floor and floor rail assemblies;

re-installing the rear approximately one-third of the truck body floor and floor rail assemblies at a floor angle approximately ten degrees greater than the pre-conversion floor angle;

increasing the height of the sidewalls by adding two fabricated sidewall extension components; and tying the fabricated sidewall extension components into the rear of the re-installed floor by adding a fabricated component;

wherein a material dam is incorporated into the canopy forward of the front wall to form a shelf that is configured to retain the payload and facilitate balancing the payload when it is loaded into the improved truck body, so that about one-third of the weight of the payload is distributed over the front axle and about two-thirds of the weight of the payload is distributed over the rear axle.

10. The method of claim 9 further comprising:

prior to modifying the truck body, establishing the sizes of the components to be added by determining an approximate improved truck tonnage capacity by subtracting the weight of the improved truck body and the chassis from the gross vehicle weight rating established by the manufacturer of the truck body and chassis, calculating an approximate improved truck body volume when hauling the lowest density material expected to be hauled, and establishing an approximate size for each component so that the improved truck body accommodates the calculated approximate improved truck body volume.

11. A process for converting a truck body having a tailgate to a truck body without a tailgate, wherein the truck body comprises a floor and floor rail assemblies, said process comprising:

removing the tailgate;

cutting off the rear approximately one third of the truck body;

re-installing a portion of the rear third of the truck body at an angle that is about ten degrees greater than the angle of inclination of the floor of the front two-thirds of the truck body;

connecting the floor rail assemblies on the rear third of the truck body to the floor rail assemblies on the front two-thirds of the truck body;

adding side boards on top of the truck body to increase its volumetric capacity; and adding a material dam to the front of the truck body to create a loading shelf.

12. A method for converting a truck body having a canopy, a floor, floor rail assemblies, sidewalls, a front wall and a tailgate attachment, said method comprising:

removing the tailgate attachment and the rear approximately one-third of the floor and floor rail assemblies and a portion of the rear sidewalls;

re-installing the rear approximately one-third of the floor and floor rail assemblies at an angle approximately ten degrees higher than the angle of inclination of the remaining front portion of the floor to produce a raised rear floor;

increasing the height of the sidewalls with fabricated sidewall extensions;

tying the fabricated sidewall extensions to the raised rear floor with a fabricated component; and installing a material dam on the rear of the canopy, forward of the truck body front wall, to form a material shelf.

13. A method for converting a dump truck body into an improved truck body, said dump truck body being configured for hauling a payload and having a canopy, a floor, two sidewalls, and a front wall, said dump trunk body being supportable by a chassis having a front axle and a rear axle, and said floor being sloped at a pre-conversion floor angle with respect to a plane extending between said two axles, said method comprising:

if the dump truck body has a tailgate, removing the tailgate;

extending the floor to the rear by adding a floor extension component at a floor angle approximately ten degrees greater than the pre-conversion floor angle;

increasing the height of the sidewalls by adding two fabricated sidewall attachment components; and tying the fabricated sidewall attachment components into the rear of the floor extension component by adding a fabricated component;

wherein a material dam is incorporated into the canopy forward of the front wall to form a shelf that is configured to retain the payload and facilitate balancing the payload when it is loaded into the improved truck body, so that about one-third of the weight of the payload is distributed over the front axle and about two-thirds of the weight of the payload is distributed over the rear axle.

* * * * *